(12) United States Patent
Hirayama

(10) Patent No.: US 6,257,880 B1
(45) Date of Patent: Jul. 10, 2001

(54) HEATER BOX TO BEND PVC CONDUIT

(76) Inventor: Edward K. Hirayama, 135 Terrace Dr., Hilo, HI (US) 96720

(*) Notice: Subject to any disclaimer, the term of this patent is extended or adjusted under 35 U.S.C. 154(b) by 0 days.

(21) Appl. No.: 09/635,557

(22) Filed: Aug. 10, 2000

(51) Int. Cl.[7] ............................................. F24J 3/00
(52) U.S. Cl. ......................... 432/225; 432/226; 219/521
(58) Field of Search ................................ 432/222, 224, 432/225, 226, 232; 219/390, 521

(56) References Cited

U.S. PATENT DOCUMENTS

| | | |
|---|---|---|
| 3,466,020 | 9/1969 | Blinne . |
| 3,843,858 * | 10/1974 | Buell .................................. 219/521 |
| 4,437,453 | 3/1984 | Temple et al. ................. 126/271.2 R |
| 5,017,760 | 5/1991 | Miller .................................. 219/390 |
| 5,073,108 * | 12/1991 | Kirby .................................. 432/225 |
| 5,205,732 * | 4/1993 | Kirby .................................. 432/225 |
| 5,853,289 | 12/1998 | Todd et al. ............................ 432/225 |
| 6,033,213 * | 3/2000 | Halvorsen, Jr. ....................... 432/225 |

FOREIGN PATENT DOCUMENTS 1007023  3/1977  (CA) .

* cited by examiner

Primary Examiner—Gregory Wilson
(74) Attorney, Agent, or Firm—Richard C. Litman

(57) ABSTRACT

A heater box to bend PVC conduit in the form of an elongated metal box, split into upper and lower portions and hinged along one side so as to be openable for insertion of a segment of a plastic conduit lengthwise through the box, the box having, at either end, cutout portions so as to allow the closure of the box around the pipe. In one embodiment, corresponding semicircles are cut from upper and lower end portions of the heating box so as to allow a pipe segment to fit when placed therein. A burner located within the lower box portion extends along the elongated box to provide uniform heating. A baffle extends over the burner along its length. The box bottom and lower sides are perforated to provide combustion air. The hot combustion gases are directed upward around the baffle and up to the conduit segment. Supports, spaced along the length of the elongated box support the heating pipe segment above the hot baffle. These supports run perpendicularly underneath the plastic pipe while heating. Two spaced-apart guides extend the length of the box and are attached to the upper sides of the supports so as to guide a conduit along the center of the supports. The guides are of steel rod or pipe. Lighter holes are located in the vicinity of the burner.

9 Claims, 5 Drawing Sheets

HEATER BOX TO BEND PVC CONDUIT

BACKGROUND OF THE INVENTION

1. Field of the Invention

The present invention relates to a heating device, and, more particularly, a heater box to heat polyvinyl chloride (PVC) or similar conduit for the purpose of bending the conduit.

2. Description of the Related Art

Polyvinyl chloride(PVC) pipe is popular for a variety of applications including electrical conduits, pipelines, household plumbing, and utility connections. It is expedient to do bending at a site where the conduit is installed. A portable heating device is therefore needed to accomplish this task. The present invention provides a simple device to economically accomplish this task which is readily transported and hand carried. The related art describes various heater apparatus useful for heating plastic pipe for bending or other shape modifications. The art of interest will be discussed in the order of their perceived relevance to the present invention.

U.S. Pat. No. 5,853,289, issued on Dec. 29, 1998, to Todd et al., describes a gas-supplied pipe heater having a hinged heater box with a gas burner located in the lower portion of the box and a baffle extending along the length of the box and above the burner. The box has accommodation for a plastic pipe inserted for bending to protrude from both ends of the box and to be positioned so as to maintain the inserted pipe above the baffle to avoid direct flame on the pipe. The accommodation is circular cutouts so arranged relative to the box hinge that the box can be placed around a segment of pipe and closed to heat that segment without the necessity of inserting an end of the conduit into the box. The present invention is distinguishable in that it provides spaced supports within the length of the heater box for supporting conduit for heating along the length thereof that extends within the heater box to avoid heated pipe from touching the hot lengthwise baffle through sagging or otherwise. The present invention also employs two lengthwise spaced guides extending along the length of the box and attached to the upper side of the spaced supports so as to allow easy insertion of a plastic conduit through one box end and out the other. These guides may be of any appropriate structure such as solid steel rods or pipes.

U.S. Pat. No. 5,017,760, issued on May 21, 1991 to L. A. Miller, describes an elongated heating device for heating plastic pipe or conduit, having an inner lengthwise pipe wound with an electric heating element, all of which is surrounded by a housing. The present invention is distinguishable in that the housing or box may be opened and closed around the plastic conduit being heated so it is useful in locations where the conduit is already installed and cannot readily be separated into lengths or segments. The present invention is also heated by gas which makes it usable in locations where electricity may not be available.

U.S. Pat. No. 4,437,453, issued on Mar. 20, 1986 to Temple et al., describes a heating device for plastic pipe or conduit and comprises an elongated inner pipe segment surrounded by a manifold which has a "T" portion normal to the manifold, the "T" portion fitting over the exhaust pipe of an internal combustion engine. Plastic pipe or conduit is inserted into an end of the elongated, heated inner pipe segment for heating as desired. The present invention is distinguishable in that the housing or box may be opened and closed around the plastic conduit being heated so it is useful in locations where the conduit is already installed and cannot readily be separated into lengths or segments. Also, proximity to an operating internal combustion engine is not required.

U.S. Pat. No. 3,466,020, issued on Sep. 9, 1988, to C. F. Blinne, describes a plastic pipe heater employing oil or other fuel. The heating chamber is generally cylindrical having an outer casing and an inner tube having truncated conical ends so as to narrow the inner tube at the entrance and exit of the inner tube, thereby providing a loose fit to the outside diameter of the plastic pipe or conduit to be heated. Heated gas is introduced tangentially into the annular volume between the outer casing and inner tube. The inner tube can act as a baffle to protect the plastic pipe from direct contact with the heating gases. The heating chamber has a clamshell type hinged opening means to allow it to be opened to allow the insertion of plastic pipe in the middle of a length thereof. Since the inner tube is in direct contact with heating gases, careful control of heat is necessary to avoid overheating of the plastic pipe. The present invention differs from this apparatus in that the inventive apparatus is much less. complex, being easily portable to a job site for use. There is provision of a baffle and supports therein which keep the plastic conduit to be heated away from the hot baffle, therefore requiring less rigid control of temperature to be effective and avoid damage to conduit being heated. There are guides attached to the supports which assist the insertion of a conduit end through the heater box.

Canadian Patent 1,007,023, issued on Mar. 22, 1977, describes a device for heating and bending plastic pipe, employing heated air for heating the plastic pipe and cooling air or other fluid for cooling the bent plastic pipe. A rotatable heating jacket is employed to provide heat to the plastic pipe in the portion to be bent around a mandrel. Heating or cooling air may be introduced axially into the pipe to accomplish bending or cooling of the bent pipe. The present invention is distinguishable in that the present intention is a much simpler and more transportable device. Use of the present invention is not restricted to bending near the end of a plastic pipe segment but may be used anywhere on a pipe segment or a pipeline to accomplish heating to allow bending in the most practical manner.

None of the above inventions and patents, taken either singularly or in combination, is seen to describe the instant invention as claimed. Thus a heater box to bend PVC conduit solving the aforementioned problems is desired.

SUMMARY OF THE INVENTION

The use of plastic pipe, particularly PVC pipe is widespread for a number of uses such as for pipeline, utility connections, and for conduits for electrical wiring. Although the present invention is directed toward heating of plastic conduit for bending for its use as electrical wiring conduit, the present invention may be used for heating any thermoplastic pipe for any use that is appropriate. The present invention provides for an elongated metal box split into upper and lower portions and hinged along one side so as to be openable for insertion of a segment of a plastic conduit lengthwise through the box, the box having, at either end, cutout portions so as to allow the closure of the box around the pipe. In one embodiment, slots cut out of the upper portion of each box end and having the upper part of each slot conforming to a half circle allow easy closure of the box around the plastic conduit while conforming to its shape to limit the amount of hot gases exiting the box. In another embodiment, corresponding semicircles are cut from upper and lower end portions of the heating box so as to allow a pipe segment to fit when placed therein. A flammable gas supply is provided to a burner located within the lower box portion which extends for a substantial length along the elongated box to provide uniform heating. A baffle extends over the burner along its length to prevent direct flame from engulfing the plastic pipe being heated. Perforations are located in the box bottom and lower sides to provide air for combustion of gas from the burner. The hot products of combustion are then directed upward around the baffle and up to the pipe segment being heated. Supports, spaced along the length of the elongated box, support the pipe segment being heated so that it remains above the hot baffle. These supports are connected by pop rivets or the like to front and back walls of the lower portion of the elongated box and are perpendicular thereto and extend therebetween so as to run underneath the plastic pipe while it is being heated within the closed box. At least two spaced-apart guides extend the length of the box and are attached to the upper sides of the supports in such locations as to guide a conduit inserted into the opening at one end of the heater box along the center of the supports to readily reach the opposite end opening in a position to travel therethrough with ease. The guides may conveniently be made of steel rod or pipe as desired. Holes of appropriate size are located in one end of a lower end of the heater box in the vicinity of the burner to facilitate lighting of the gas burner.

Accordingly, it is a principal object of the invention to provide a heating system for heating a segment of plastic pipe or conduit to allow bending thereof.

It is another object of the invention to provide a heating system having the object above which is easily portable and inexpensive to use.

It is a further object of the invention to provide a heating system which may be applied over a segment of pipe remote from the pipe ends.

Still another object of the invention is to provide a heating system wherein pipe is protected from open flame while heating.

Yet another object of the invention is to provide a heating system having means for easy insertion of pipe therethrough and for turning the pipe while heating.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed toward heating of plastic conduit for bending for its use as electrical wiring conduit, although the present invention may be used for heating any thermoplastic pipe for any use that is appropriate. The present invention provides for an elongated metal box split into upper and lower portions and hinged along one side so as to be openable for insertion of a segment of a plastic conduit lengthwise through the box, the box having, at either end, cutout portions so as to allow the closure of the box around the pipe. In one embodiment, slots cut out of the upper portion of each box end and having the upper part of each slot conforming to a half circle allow easy closure of the box around the plastic conduit while conforming to its shape to limit the amount of hot gases exiting the box. In another embodiment, corresponding semicircles are cut from upper and lower end portions of the heating box so as to allow a pipe segment to fit when placed therein. A flammable gas supply is provided to a burner located within the lower box portion which extends for a substantial length along the elongated box to provide uniform heating. A baffle extends over the burner along its length to prevent direct flame from engulfing the plastic pipe being heated. Perforations are located in the box bottom and lower sides to provide air for combustion of gas from the burner. The hot products of combustion are then directed upward around the baffle and up to the pipe segment being heated. Supports, spaced along the length of the elongated box, support the pipe segment being heated so that it remains above the hot baffle. These supports are connected by pop rivets or the like to front and back walls of the lower portion of the elongated box and are perpendicular thereto and extend therebetween so as to run underneath the plastic pipe while it is being heated in the closed box. At least two spaced-apart guides extend the length of the box and are attached to the upper side of the supports in such a location as to guide a conduit inserted into the opening at one end of the heater box along the center of the supports to readily reach the opposite end opening in a position to travel therethrough with ease, and to maintain the PVC pipe in a position centered over the burner. The guides may conveniently be made of steel rod or pipe as desired. Holes of appropriate size are located in one end of a lower end of the heater box in the vicinity of the burner to facilitate lighting of the gas burner.

Figure 1:
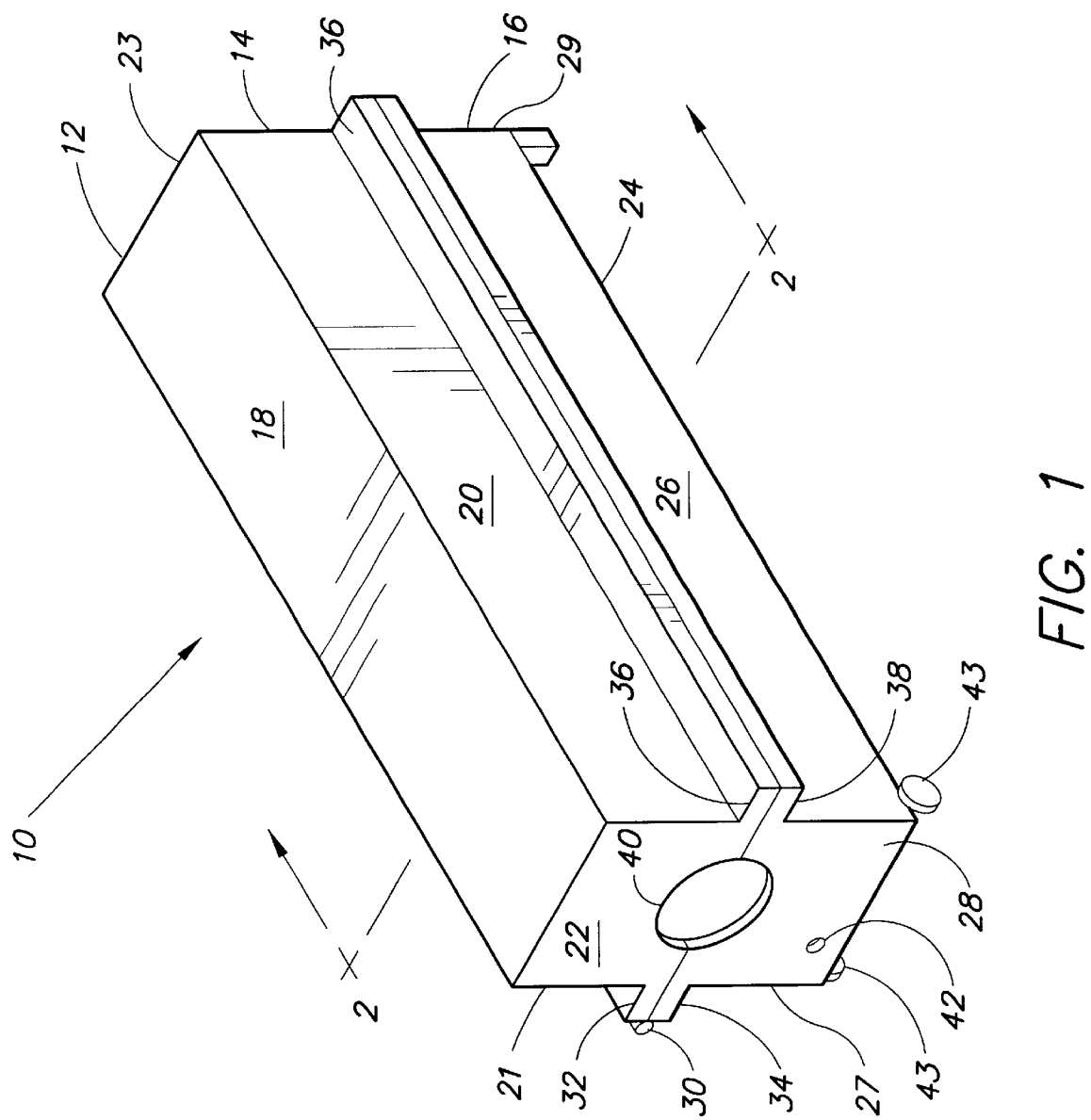
FIG. 1 is a perspective view of a heater box to bend PVC conduit according to the present invention.

Referring to FIG. 1, there is generally depicted an environmental perspective view of heating device 10 including box 12 having upper portion 14 and lower portion 16. The upper portion 14 includes top 18 and first upper portion side 20, second upper portion side 21, first upper portion end 22, second upper portion end 23, while the lower portion 16 includes base 24, first lower portion side 26, second lower portion side 27, first lower portion end 28, and second lower portion end 29. Piano hinge 30 connects upper box portion 14 and lower box portion 16 by means of attaching piano hinge upper lip 32 and piano hinge lower lip 34 for allowing rotation therebetween and thus allowing the opening of heater box 12 by rotation of upper portion 14 around hinge 30 relative to the lower portion 16 of box 12. Upper lip 36 and lower lip 38 correspond to lips 32 and 34, respectively, and are thus separated upon opening of the heating box 12. Cutout 40 allows the insertion of a segment of plastic conduit within heating box 12. Aperture 42 allows the insertion of a lighting device to light the fuel gas supplied to the heater box 12. Wheels and axle 43 are attached along the base 24 and near first lower end 28.

Figure 2:
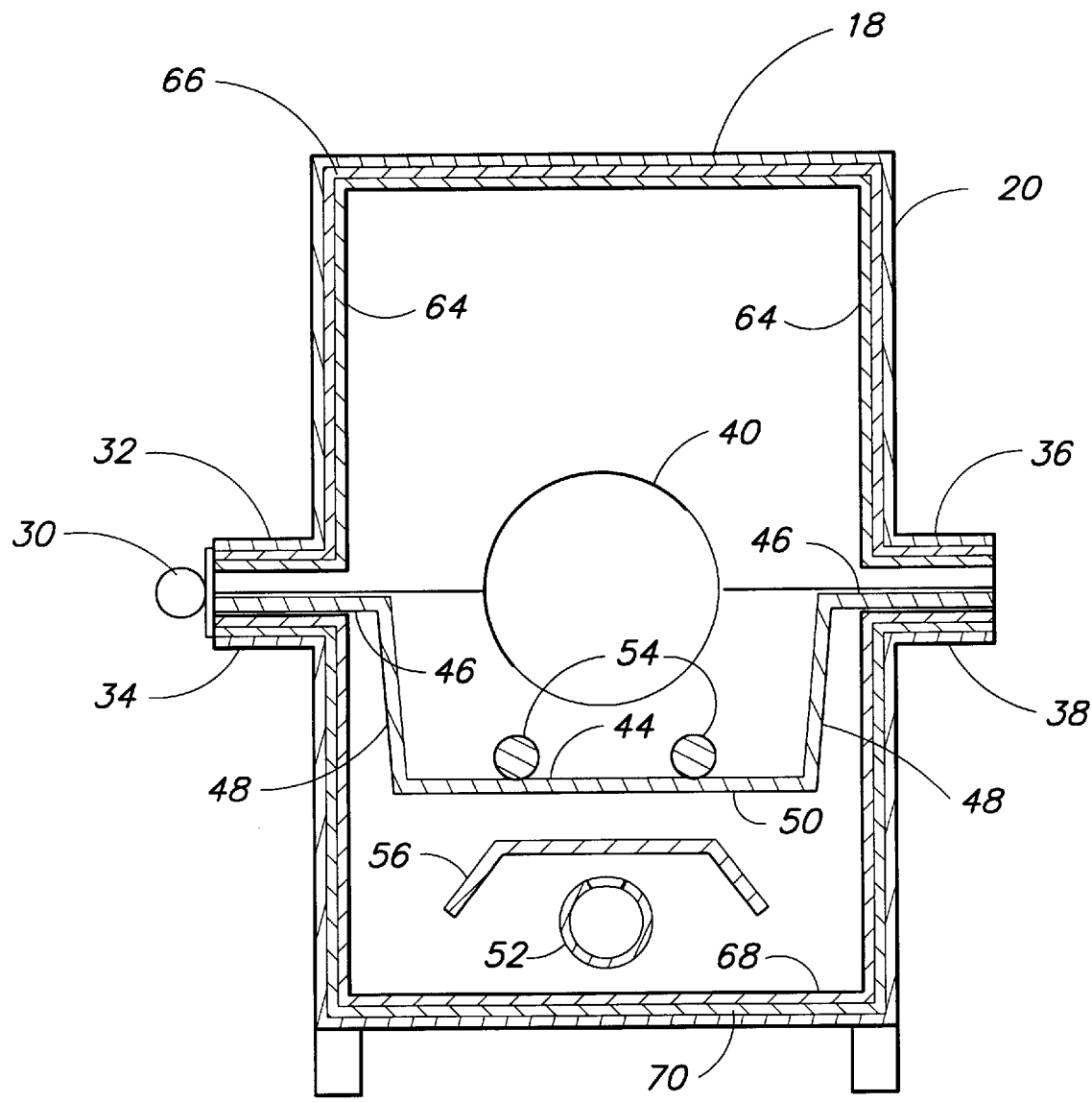
FIG. 2 is a section view drawn along lines 2—2 of FIG. 1 showing further details of the inner construction of the heating device.

Referring to FIG. 2 there is shown a sectional view cut along 2—2 of FIG. 1 further depicting the internal construction of heating box 12 wherein conduit support member 44 is made up of support upper arms 46, support vertical arms 48, and support cross member 50. Fuel gas burner 52 supplies heat to heater box 12. Guides 54 are attached to support cross member 50 of conduit support members 44(only one shown). Baffle 56 runs lengthwise of fuel gas burner 52 to protect any plastic conduit resting on conduit support members 44 between guides 54 from exposure to direct flame from gas burner 52. Guides 54 are preferably constructed from ⅜ or ¼ inch galvanized pipe. Fuel burner 52 is preferably constructed from 1 inch pipe.

Figure 3:
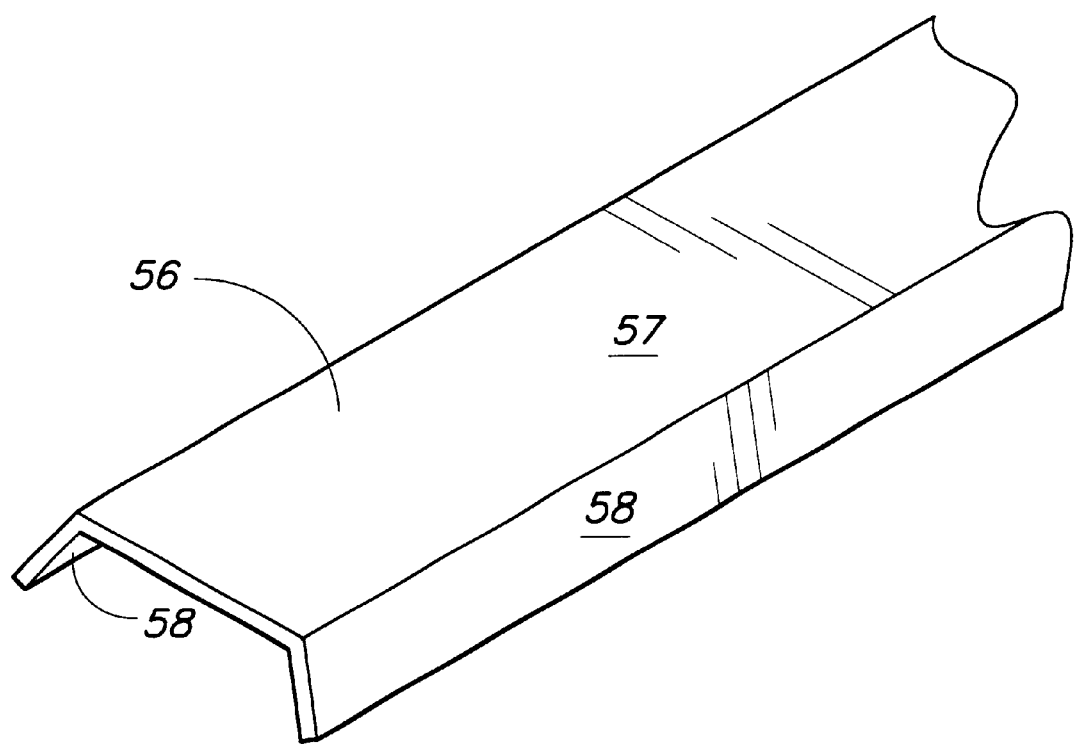
FIG. 3 is a fragmented detail view in perspective of the baffle of FIG. 2.

Referring to FIG. 3, there is shown a detail view of baffle 56 having baffle top 57 and angled baffle sides 58.

Referring back to FIG. 2, upper inner liner 64 lines the upper portion 14, providing room for upper insulation 66 between liner 64 and top 18, sides 20 and 21 and end 22 to retain heat within the heater box 12. Similarly, lower portion inner liner 68 lines the lower portion 16 and provides separation between it and lower portion base 24, sides 26 and 27, and ends 28 and 29 for lower insulation 70 to further retain heat within the heater box 12. Inner liners 64 and 68 are preferably constructed of stainless steel sheet metal. Outer portions 14 and 16 are preferably constructed of galvanized sheet steel. The insulation used is preferably dock liner.

Figure 4:
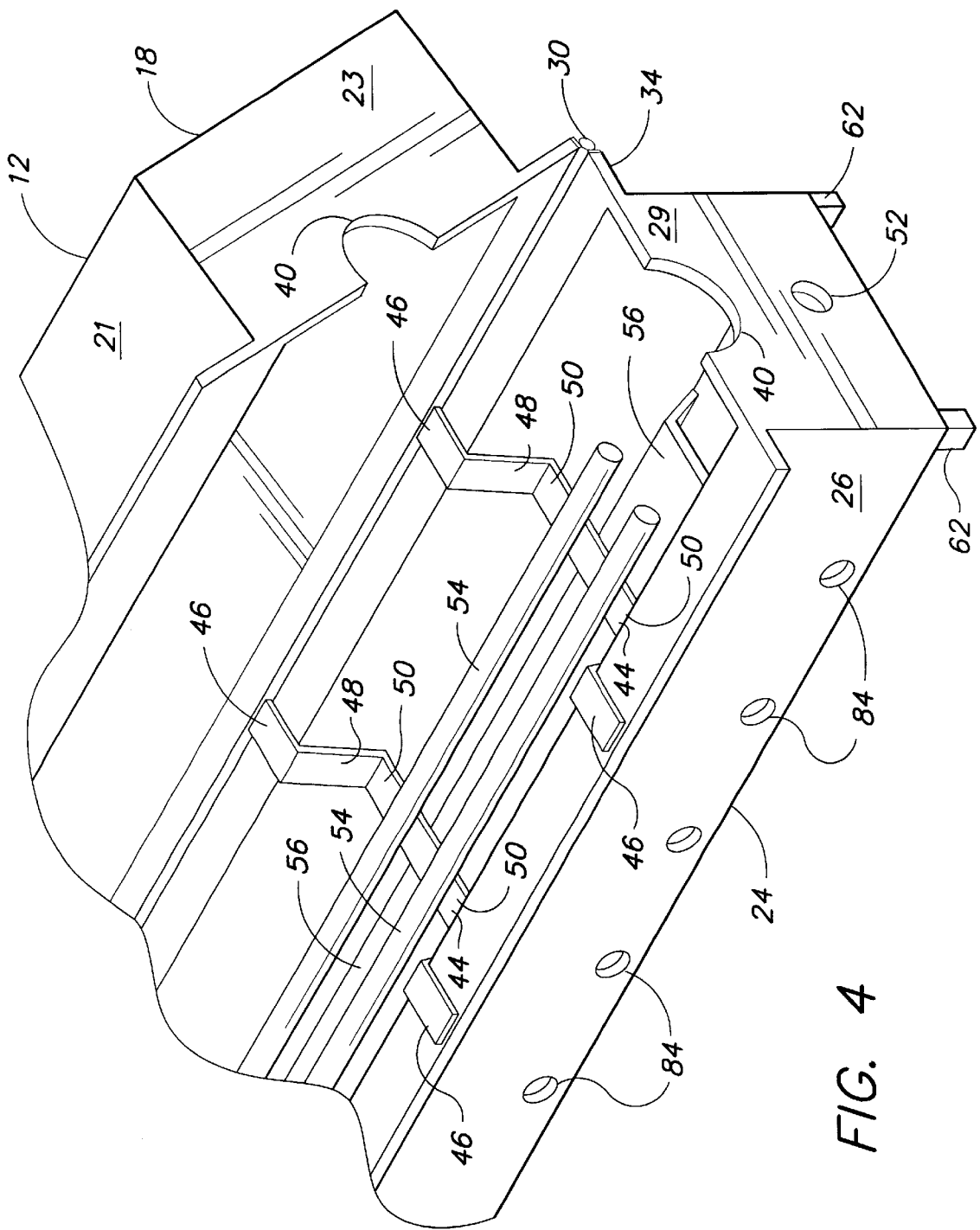
FIG. 4 is a perspective view of the heater box with the heater upper portion in the open position to further reveal the inner structure of the heater box of FIG. 1.

Referring to FIG. 4 there is shown a diagrammatical perspective view from the second ends 23 and 29 showing the heater box in an opened position to better view conduit support members 44 of which there are a plurality along the length of heater box 12. Also seen is baffle 56 extending along the length of gas burner 52. Conduit support members 44 have support upper arms 46, support vertical arms 48, and support cross members 50. Guide rods 54 rest on support cross members 50 and extend substantially the length of box 12. Legs 62 are located at the base 24 near second lower end 29. Perforations 84 allow entrance of air for burner 52 and are located along lower sides 26 and 27 and along the base 24 (not shown).

Figure 5:
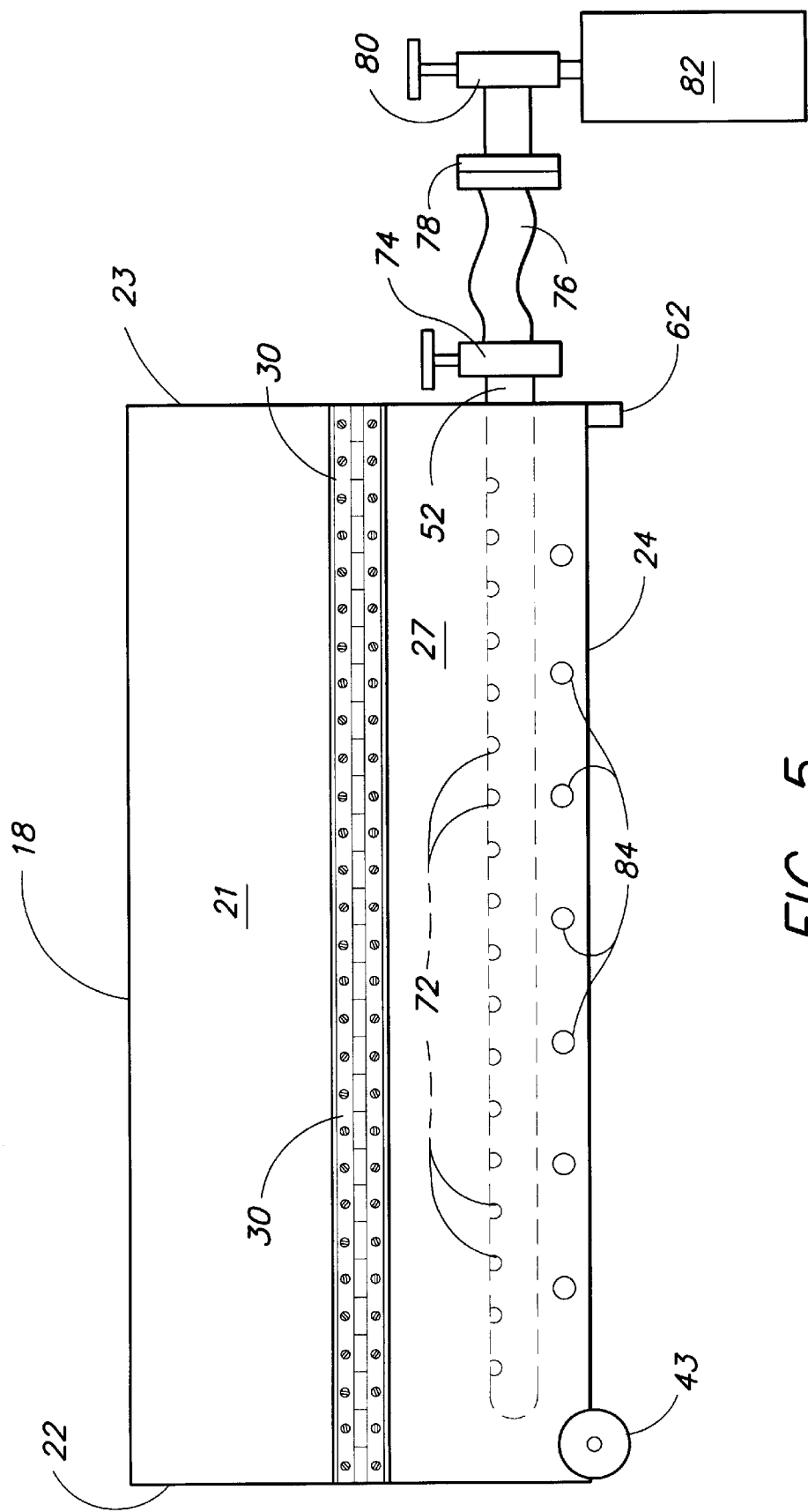
FIG. 5 is a side view in elevation of the heating device of FIG. 1 with the baffle omitted to show the piano hinge and details of the fuel gas and burner system of FIG. 1.

Referring to FIG. 5 there is shown an elevation view along second sides 21 and 27 wherein burner 52 is shown in more detail, having orifices 72 along the top thereof (see hidden lines) for allowing gas for burning to escape. Piano hinge 30 is better shown as extending substantially the full length of heater box 12. Perforations 84 are shown along the length of first and second lower walls 26 and 27. Fuel gas is supplied to burner 52 through gas orifice valve 74, gas hose 76, regulator 78, valve 80 and fuel gas tank 82.

In operation, fuel gas is supplied to burner 52 where it escapes through orifices 72 and mixes with air from perforations 84 and the mixture is lit by a lighter placed into the lower portion 16 of heater box 12 through gas lighting orifice 42. Once the box is brought up to working temperature, the upper portion 14 is swung upon on piano hinge 30 and a length of plastic pipe, such as PVC conduit, is placed into cutout conduit openings 40 and the upper portion 14 closed around the pipe. Another manner of operation is to leave the upper portion 14 of heated heater box 12 closed and the conduit inserted through one opening 40 and out the other opening 40 in the respective ends of box 12. In this embodiment guide rods 54 assist in keeping the conduit headed toward the opposite cutout conduit opening 40 during insertion so the end may pass through and the desired segment of conduit brought into heater box 12. Within the lower portion 16 of box 12, there are installed a plurality of conduit support members 44 crossing the open area between opposing walls 26 and 27 at a level so as to assist in supporting a conduit within the enclosure of heater box 12. Guide rods 54 rest on the upper surface of the support members 44 along the length of heater box 12. The plastic conduit may be rotated axially to promote even heating if desired. Once the plastic conduit is brought up to a pliable temperature it may be removed from the heater box 12 by either pulling it out through the openings 40 or by lifting upper portion 14 so as to allow the lifting out of the plastic conduit segment having been heated. The plastic conduit is now ready to bend over a mandrel or by other means as desired.

It is to be understood that the present invention is not limited to the embodiments described above, but encompasses any and all embodiments within the scope of the following claims.

I claim:

1. An elongated heater box to bend PVC conduit comprising:

a) an upper portion;
   b) a lower portion having opposing walls, the lower portion being attached lengthwise by a piano hinge to said upper portion so as to form a hinged side, the upper portion and the lower portion defining an elongated box;
   c) a burner extending substantially the length of said lower portion and centrally disposed within a lower level of said lower portion;
   d) a plurality of support means extending between the opposing walls of said lower portion of the heater box so as to provide support to a plastic conduit heating within said heater box; and
   e) a pair of parallel guide rods extending substantially the length of said elongated heater box and resting on said plurality of support means;
   f) said upper portion and said lower portion having a cutout portion defined at each end thereof, each cutout portion interacting to define an opening therein in a generally circular shape such that plastic pipe may fit therethrough so as to expose a desired segment of plastic conduit to heating within the heater box.

2. The heater box of claim 1, further comprising a baffle extending substantially the length of said lower portion and so located above said burner as to deflect any flame emanating from said burner from any conduit being heated in said heater box.

3. The heater box of claim 2, wherein said baffle is located above said burner and below said conduit support means.

4. The heater box of claim 1, wherein said upper portion and said lower portion have inner and outer walls and wherein the heater box further comprises a layer of insulation disposed between said inner and outer walls, respectively.

5. The heater box of claim 4, wherein said inner walls of said upper portion and said lower portion are constructed of stainless steel sheet metal.

6. The heater box of claim 4, wherein said outer walls of said upper portion and said lower portion are constructed of galvanized sheet steel.

7. The heater box of claim 4, wherein said insulation is dock liner.

8. The heater box of claim 1, wherein said lower portion has a base and further includes a pair of wheels at one end of the base in order to allow movement of the box by lifting the opposite end and rolling the heater box on said pair of wheels.

9. The heater box of claim 8, further comprising a pair of legs near an end of said base opposite from the end at which said wheels are mounted in order to support the heater box while in use.

* * * * *